US010220526B2

(12) United States Patent
De-Gol

(10) Patent No.: US 10,220,526 B2
(45) Date of Patent: Mar. 5, 2019

(54) ROTARY COUPLING DEVICE FOR A MULTI-AXIS MANIPULATOR

(71) Applicant: RoboCoaster Limited, Kingswinford, West Midlands (GB)

(72) Inventor: Gino De-Gol, Kingswinford (GB)

(73) Assignee: ROBOCOASTER LIMITED (GB)

( * ) Notice: Subject to any disclaimer, the term of this patent is extended or adjusted under 35 U.S.C. 154(b) by 0 days.

(21) Appl. No.: 15/553,729

(22) PCT Filed: Feb. 3, 2016

(86) PCT No.: PCT/GB2016/050244
§ 371 (c)(1),
(2) Date: Aug. 25, 2017

(87) PCT Pub. No.: WO2016/135440
PCT Pub. Date: Sep. 1, 2016

(65) Prior Publication Data
US 2018/0043548 A1    Feb. 15, 2018

(30) Foreign Application Priority Data
Feb. 25, 2015    (GB) .................................. 1503106.5

(51) Int. Cl.
*B25J 19/06*    (2006.01)
*B25J 9/10*    (2006.01)
(Continued)

(52) U.S. Cl.
CPC ............. *B25J 19/06* (2013.01); *B25J 9/0009* (2013.01); *B25J 9/108* (2013.01); *B25J 19/066* (2013.01);
(Continued)

(58) Field of Classification Search
CPC . A63G 1/00; A63G 1/10; A63G 31/00; A63G 31/10; A63G 31/12; A63G 31/16;
(Continued)

(56) References Cited

U.S. PATENT DOCUMENTS 3,708,215 A    1/1973  Wilcock et al.
7,736,062 B2   6/2010  Hagshenas et al.
(Continued)

FOREIGN PATENT DOCUMENTS

EP    0481632       4/1992
GB    2364927       2/2002
WO    2011004225    1/2011

OTHER PUBLICATIONS

Written Opinion of the International Searching Authority, dated Apr. 29, 2016, from corresponding International Application No. PCT/GB2016/050244.
(Continued)

*Primary Examiner* — Kien Nguyen
(74) *Attorney, Agent, or Firm* — Brient IP Law, LLC

(57) ABSTRACT

A multi-axis manipulator in the form of a robotic arm includes a safety disc (41) and safety collar (42) at one or more of the pivoting joints (14, 17, 19, 21, 23) thereof. The disc and collar define a small running clearance in normal use, but make contact in the event of excessive wear or failure of the rotary bearing at the respective joint. An inspection window (48) permits the running clearance to be checked, and the collar may comprise a caliper brake.

14 Claims, 8 Drawing Sheets

(51) Int. Cl.
*F16C 39/02* (2006.01)
*F16C 19/52* (2006.01)
*B25J 9/00* (2006.01)
*A63G 31/16* (2006.01)
*F16C 21/00* (2006.01)
*B25J 11/00* (2006.01)

(52) U.S. Cl.
CPC .............. *F16C 19/52* (2013.01); *F16C 39/02* (2013.01); *B25J 11/003* (2013.01); *F16C 21/00* (2013.01); *F16C 2240/46* (2013.01); *F16C 2316/30* (2013.01); *F16C 2322/59* (2013.01)

(58) Field of Classification Search
CPC ............... H02K 21/00; H02K 212/042; H02K 11/0073; B25J 11/00; B25J 19/00; B25J 19/06; B25J 19/066; B25J 9/108; F16C 19/00; F16C 19/52; F16C 21/00
USPC ............ 472/39, 47, 59–60, 130; 434/29, 55; 310/66, 68 R, 68 B
See application file for complete search history.

(56) References Cited

U.S. PATENT DOCUMENTS

| | | | |
|---|---|---|---|
| 2002/0183123 A1* | 12/2002 | De-Gol | A63G 31/16 472/59 |
| 2013/0079167 A1* | 3/2013 | Hasenzahl | A63G 1/10 472/60 |
| 2014/0055010 A1 | 2/2014 | Sigal et al. | |

OTHER PUBLICATIONS

International Search Report, dated Apr. 29, 2016, from corresponding International Application No. PCT/GB2016/050244.
International Preliminary Report on Patentability, dated Sep. 8, 2017, from corresponding International Application No. PCT/GB2016/050244.

* cited by examiner

ROTARY COUPLING DEVICE FOR A MULTI-AXIS MANIPULATOR

TECHNICAL FIELD

This invention relates to rotary coupling device for a multi-axis payload manipulator, for example a computer controlled robotic arm. The invention is of use in the industrial sector in which safety critical overhead loading operations are of concern, in passenger carrying medical applications, and has application in a fairground or amusement park ride.

BACKGROUND TO THE INVENTION

Multi-axis manipulators are well-known in industry, and typically comprise multi-axis manipulators or robotic arms capable of being programmed to perform repetitive tasks. Such arms have many degrees of freedom, and may be fitted with tools of many different kinds to perform, for example, handling, welding, painting and so on.

Known manipulators of this kind are generally driven electrically, hydraulically or pneumatically, and are computer controlled.

Adjacent manipulator elements, for example at a major waist axis, elbow or wrist, are relatively movable about an axis of rotation, and suitable rolling element bearings are provided to resist axial and cantilever loads; such loads may be high in view of the potential reach of a manipulator and the forces capable of being exerted at the tool.

It has been proposed to use multi-axis manipulators in safety critical applications, in this case by way of example, for fairground and amusement park machinery, and in this application the manipulator carries a passenger carrying module or chair for one or more riders in place of a tool. Such machinery can offer far more flexibility as compared with bespoke fairground ride solutions, and moreover may offer a significantly enhanced degree of automation and integration with other amusement devices with increased reliability due to the use of standardized components. A multi-axis manipulator of this kind can also be programmed to give precisely controlled and variable motion dynamics within a defined envelope, and the ride may be changed on demand by use of a different program.

It will be understood that safety requirements for fairground and amusement park machinery are somewhat complex, and present the greatest challenge, and an absolute prerequisite is that riders are safe at all times. Accordingly the modes of potential machinery failure must be considered in detail, and to an extent which may not be necessary for an industrial device or robotic arm utilising conventional driveline components, bearings and structure whilst working in an environment from which humans are excluded.

SUMMARY OF THE INVENTION

According to the invention there is provided a rotary device comprising an input member, an output member rotatable on said input member about an axis of rotation, and one or more rolling element support bearings between said input member and output member, said bearings being adapted to resist axial and cantilever loads of said output member in use, wherein one of said input and output members includes a rim having a circular periphery co-axial with said axis, and wherein the other of said input and output members includes a safety collar overlapping said rim with a running clearance.

The invention provides that should a rolling element bearing fail to provide the necessary location and support, for example as a result of loss of one or more rolling elements structural integrity, the rim will contact the safety collar, and prevent substantial movement of the output member with respect to the input member. Other systems of known kind may be used to detect relative movement of the components, and for example to cut power to the manipulator, to gradually reduce power in a safe manner, or to move the manipulator to a pre-determined rest condition.

The running clearance is preferably as small as possible having regard to operational tolerances and inherent resilience of the components of the device, so that the rotor is at all times closely constrained. The running clearance is typically less than 5 mm and may be in the range 0.5-2.0 mm.

In an embodiment of the invention the rim is defined by a disc attachable to one of the input and output members. Such a disc can be replaced if damaged, and may also be retrofitted where required.

The safety collar may overlap one or both sides of the rim or disc and may be circularly continuous. In one embodiment a segmented collar, for example comprising semi-circular elements, is provided. Again such a collar is preferable attachable to the other of the input and output members so as to be replaceable or retrofittable.

The safety collar may include a window or other aperture to permit the running clearance to be observed and/or measured.

In one embodiment the rim or disc and/or collar may have a witness coating to visually indicate rubbing contact in use. Such a coating may comprise paint, plating or an adhered transfer or sticker, and may be useful to give a non-specialist machine minder an immediate indication of an incipient failure.

In an embodiment of the invention, the input member comprises a motor rotatable about said axis, and an epicyclic gearbox having a sun gear on said axis and a ring gear mounted to or comprising the input member, the planet carrier being coupled to the output member. Such an arrangement provides for torque multiplication and speed reduction, which may allow the use of a low torque, high speed motor.

The rim or disc and/or collar may include a braking surface having a high coefficient of friction, which may comprise a friction lining of conventional kind.

In an embodiment the collar may include a caliper brake of any suitable kind to grip the rim or disc on demand; such a brake may give a convenient dynamic and/or static brake for the output member. This may be in the form of a primary mechanical brake, or a secondary redundant and safety monitored brake.

An embodiment of the invention comprises a multi-axis manipulator having at each pivotable joint a rotary coupling according to the invention. Such a manipulator may include a baseplate defining a vertical axis for a first rotary coupling, a first arm extending from the first rotary coupling and defining at the free end thereof a horizontal axis for a second rotary coupling, a second arm extending from the second rotary coupling and defining at the free end thereof a horizontal axis for a third rotary coupling, and a chair mounted to the third rotary coupling.

It is envisaged that at each rotary coupling, the respective input member may be considered as a stator which is closer to the baseplate than the chair; however the reverse may be possible in one or all locations. The baseplate may comprise the first rotary coupling in the form of a turntable having a generally upright rotational axis.

An embodiment of the invention comprises an amusement park or fairground ride on which the free end of a multi-axis manipulator comprises a chair for one or more riders.

Other aspects of the invention are disclosed in the claims appended to this specification.

BRIEF DESCRIPTION OF DRAWINGS

Features of the invention will be apparent from the following description of an embodiment of the invention shown by way of example only in the accompanying drawings, in which.

DESCRIPTION OF AN EMBODIMENT

Figure 1:
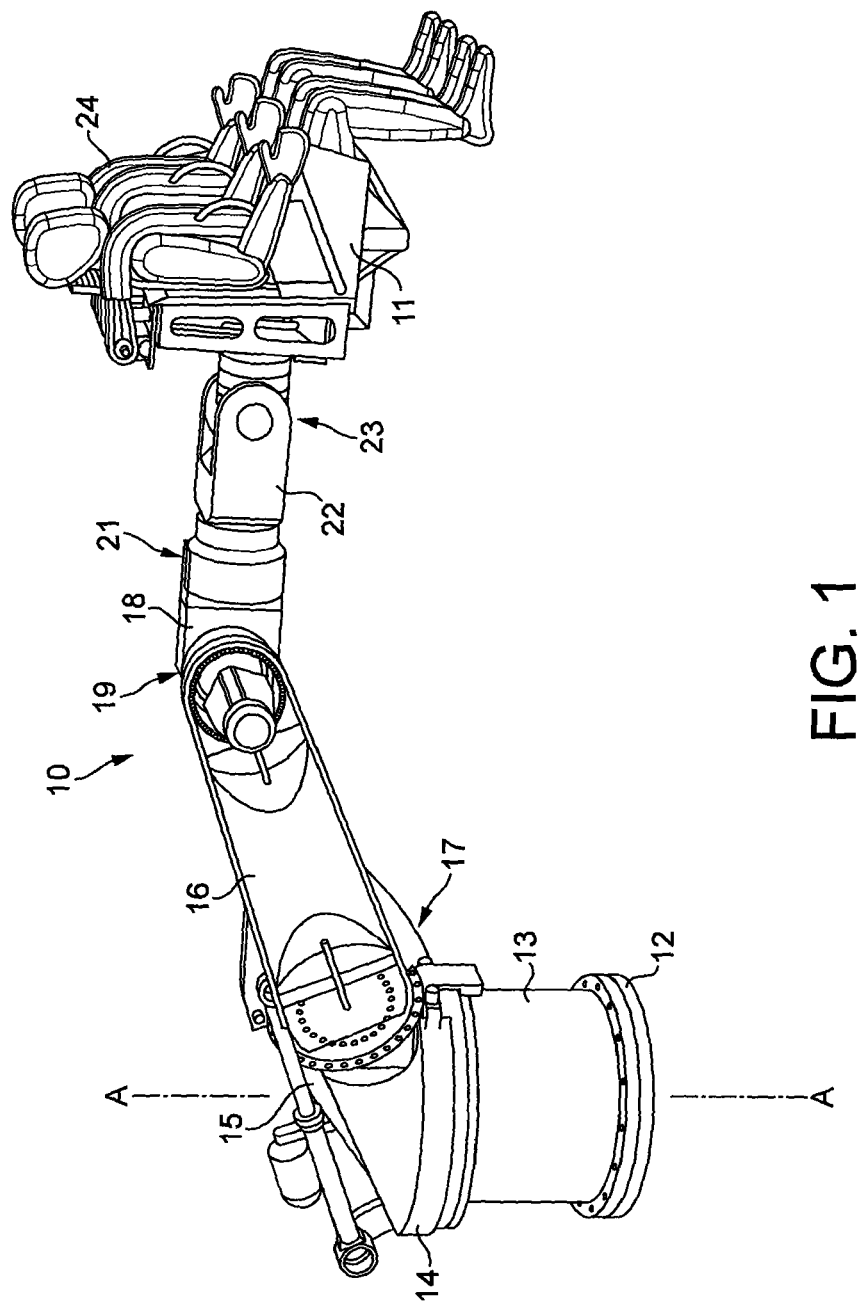
FIG. 1 is a perspective view of an exemplar multi-axis manipulator adapted to a fairground ride.
Figure 2:
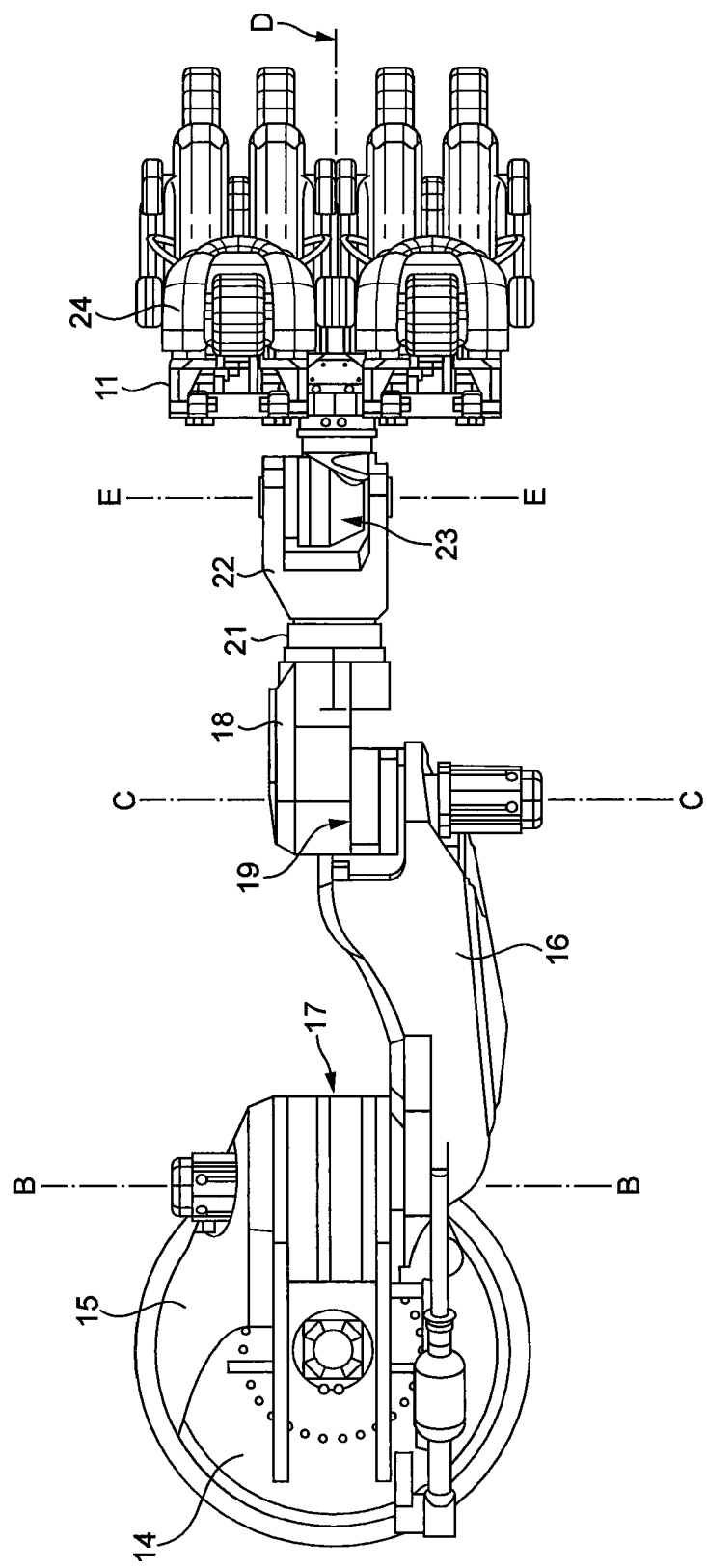
FIG. 2 is a plan view of the manipulator of FIG. 1.

FIGS. 1 and 2 illustrate a known kind of multi-axis manipulator 10 adapted to a fairground ride, and having a two-person chair 11 at the free end of a computer controlled robotic arm.

The manipulator 10 comprises a base ring 12 anchored to a substrate (not shown) such as a wheeled vehicle or permanent foundation. A base cylinder 13 has a rotary coupling 14 in the form of a turntable rotatable about a vertical axis A-A.

The turntable 14 has a short upwardly angled arm 15 defining a horizontal axis B-B at the free end, and about which a second arm 16 is pivotable via a rotary coupling 17.

The second arm 16 defines at the free end a horizontal axis C-C about which a third arm 18 is pivotable via a rotary coupling 19.

The third arm 18 has a rotary coupling 21 via which a fourth arm 22 is rotatable about an axis D. The fourth arm 22 defines at the free end a pivot axis E-E about which a chair 11 is pivotable via a rotary coupling 23.

As illustrated, the chair carries two persons, and has suitable over-the-shoulder restraint mechanisms 24. The chair could be adapted to 3, 4 or more persons depending upon the load capacity of the manipulator.

The manipulator of FIGS. 1 and 2 has five degrees of freedom and may be programmed to give an exciting high speed ride within the envelope defined by the reach of the arm. Each coupling 14, 17, 19, 21, 23 comprises typically a rolling element bearing assembly of known type, for example opposed ball or angular contact bearings suitable for supporting the axial and cantilever loads which may be expected in use.

Figure 3:
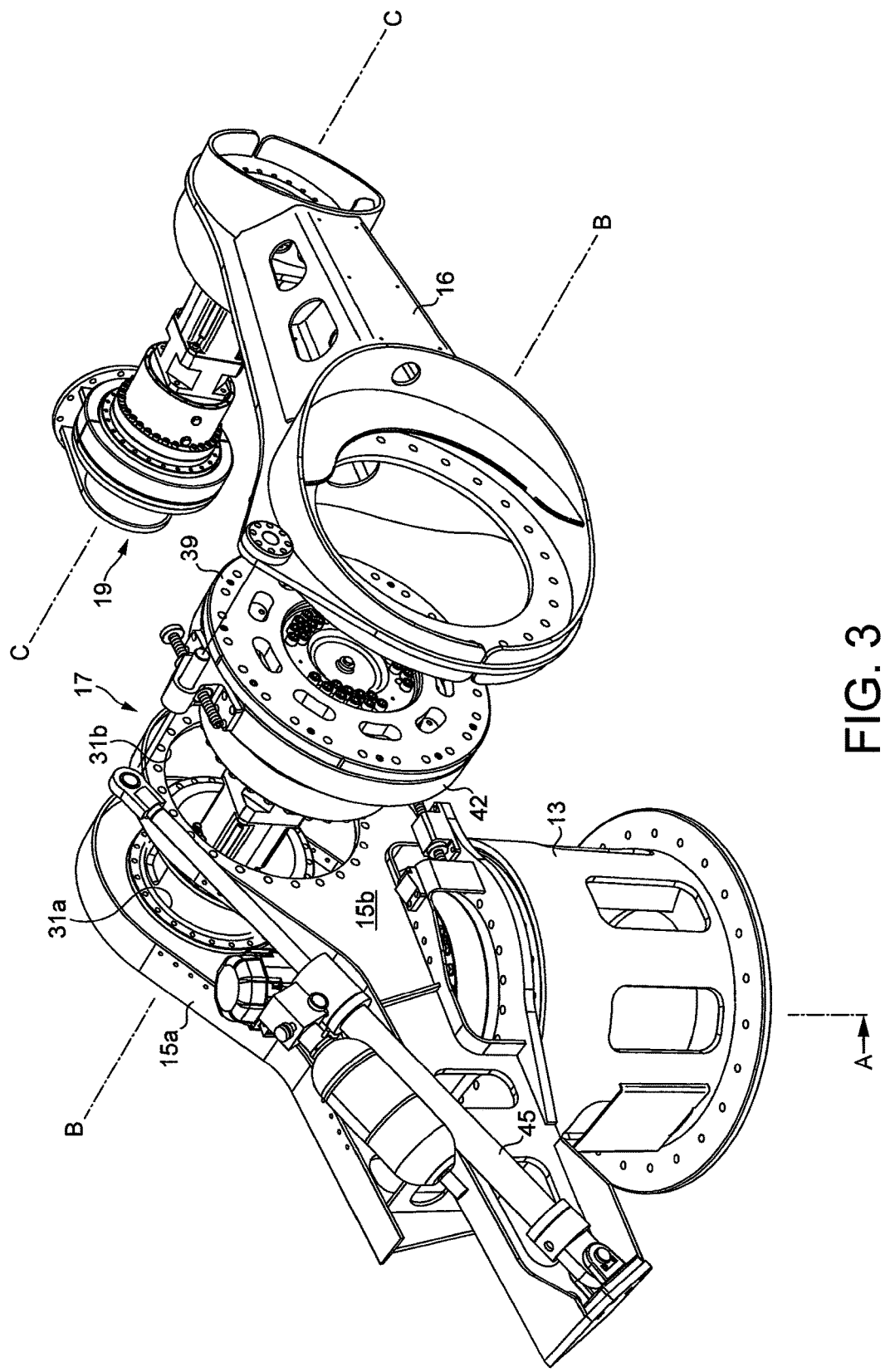
FIG. 3 is an exploded view from one side of a multi-axis manipulator incorporating an embodiment of the invention.
Figure 4:
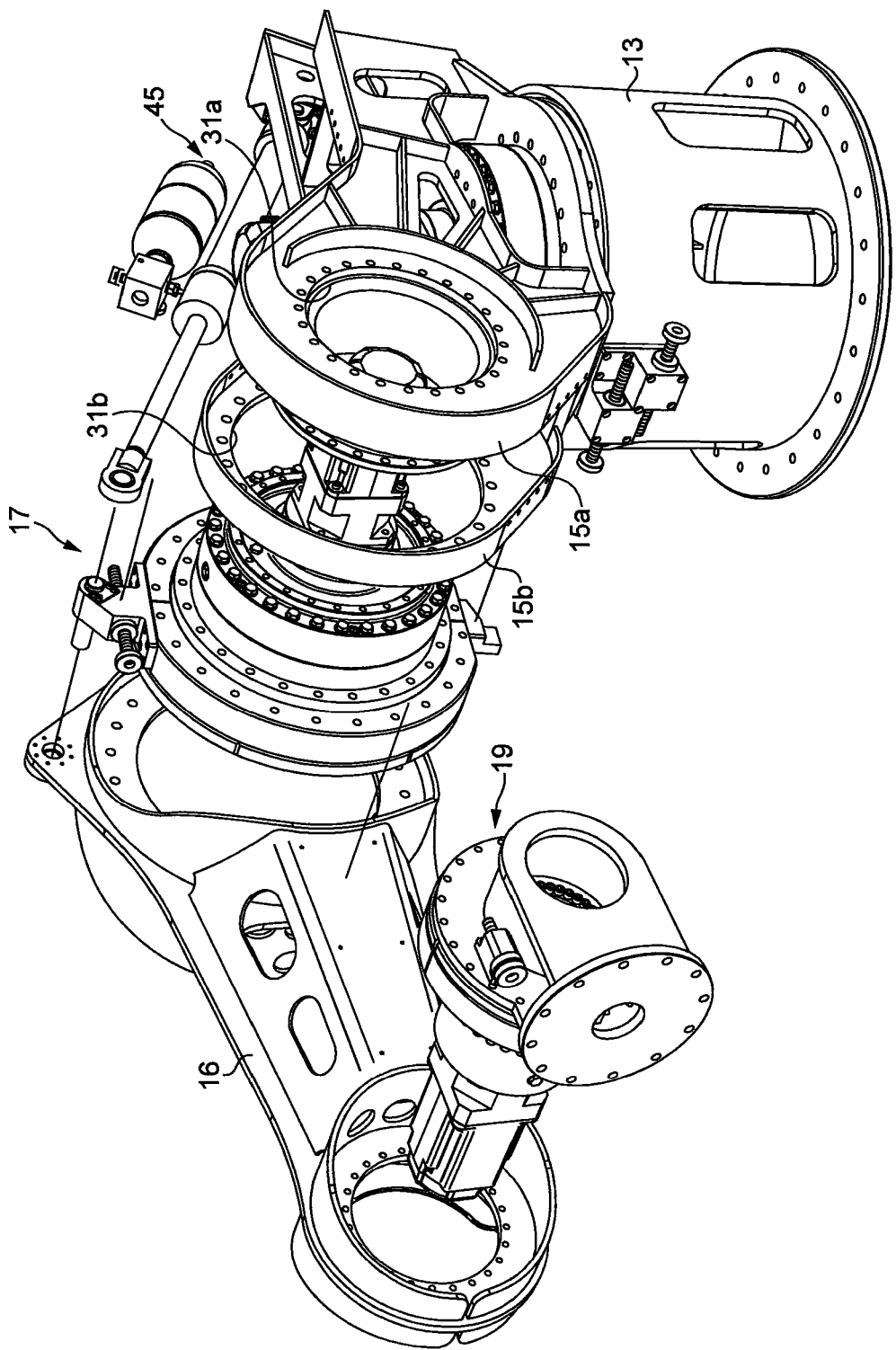
FIG. 4 corresponds to FIG. 3, and shows an exploded view from the other side.
Figure 5:
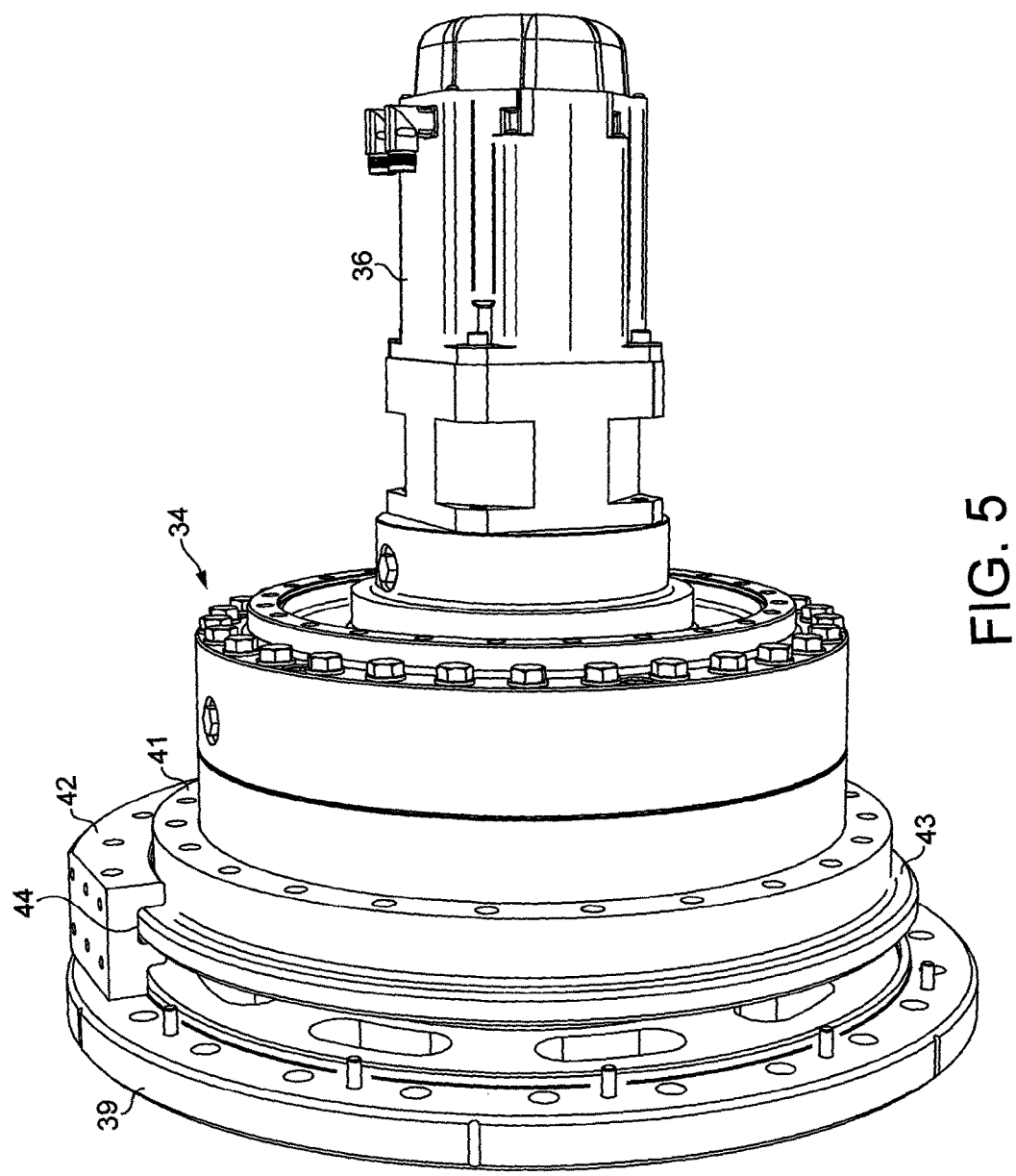
FIG. 5 is a perspective side elevation of a motor and turntable assembly incorporating an embodiment of the invention.
Figure 6:
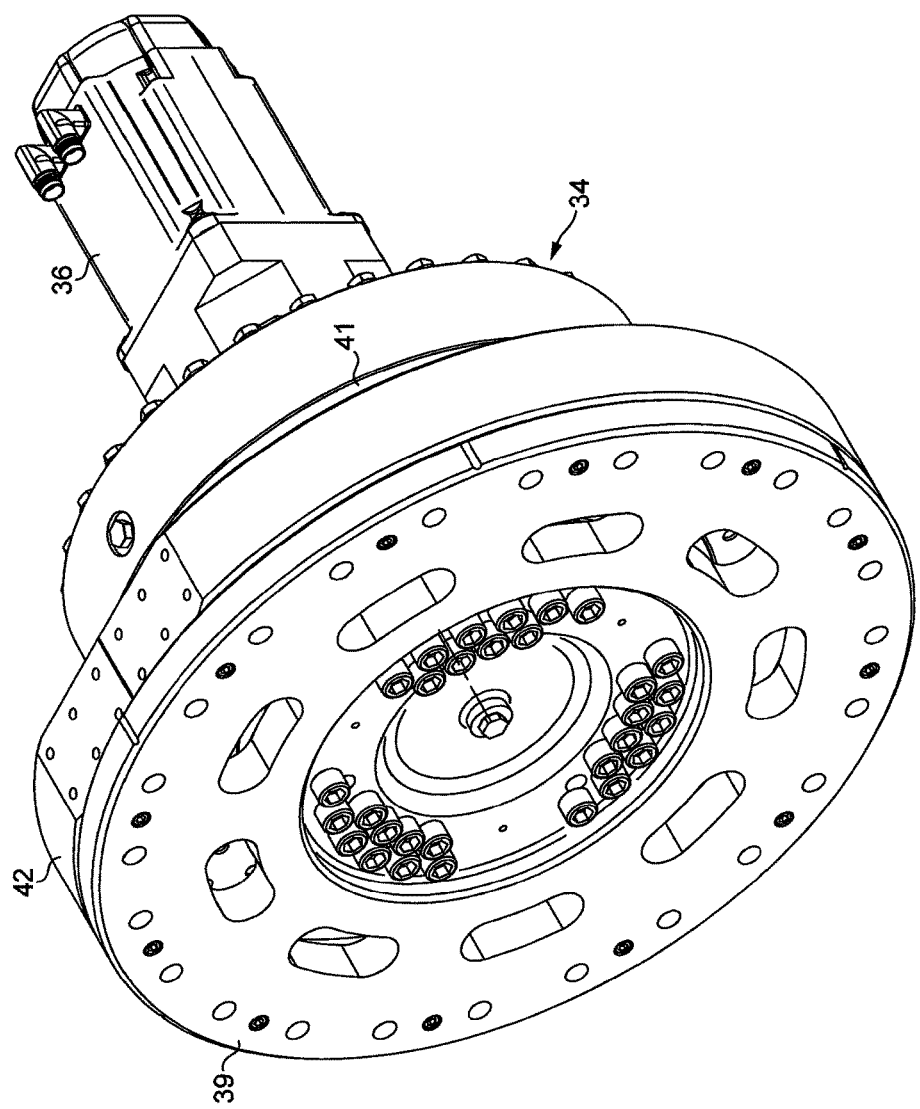
FIG. 6 corresponds to FIG. 5 and shows a perspective view from one end.
Figure 7:
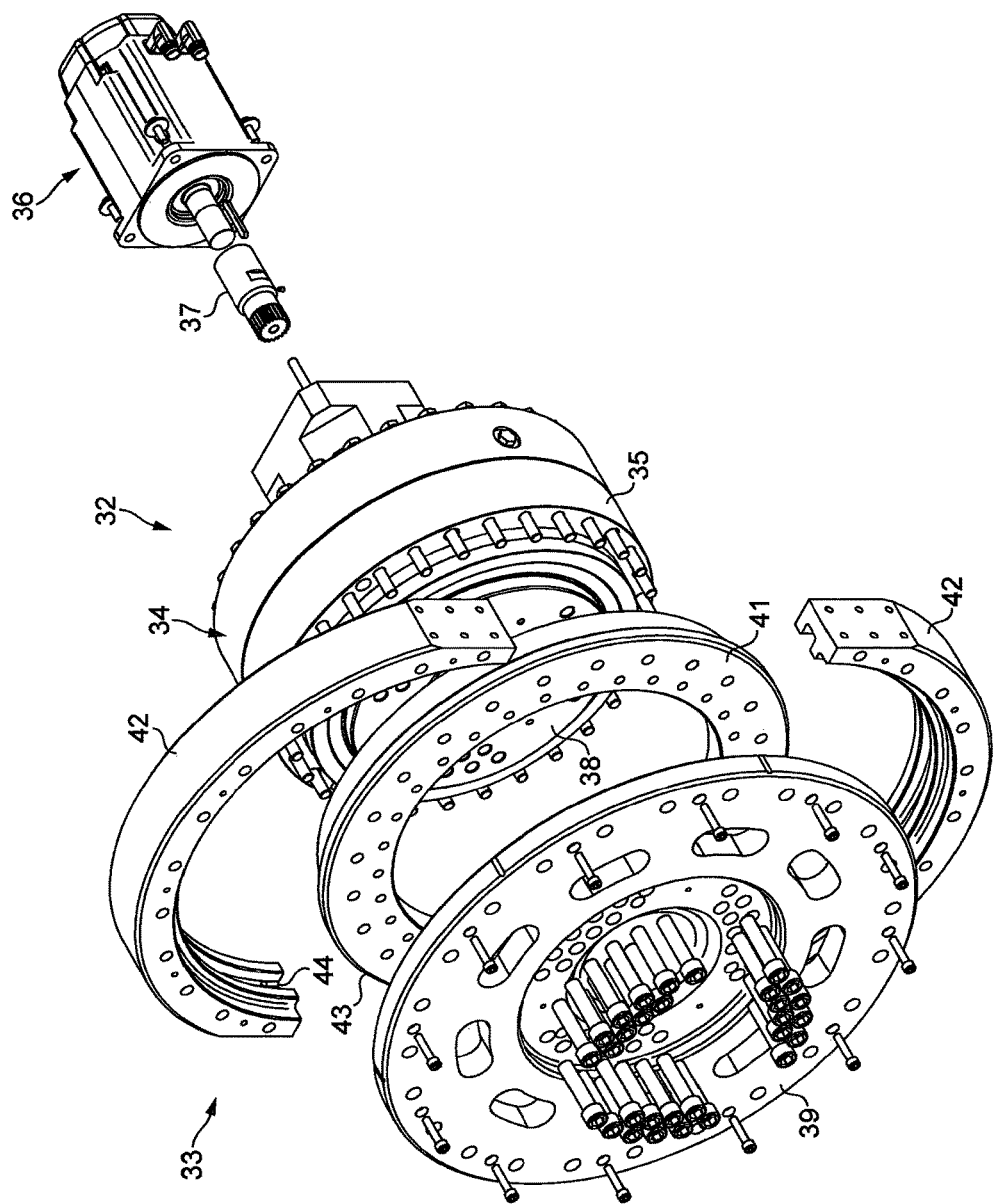
FIG. 7 is an exploded view of the assembly of FIGS. 5 and 6.
Figure 9:
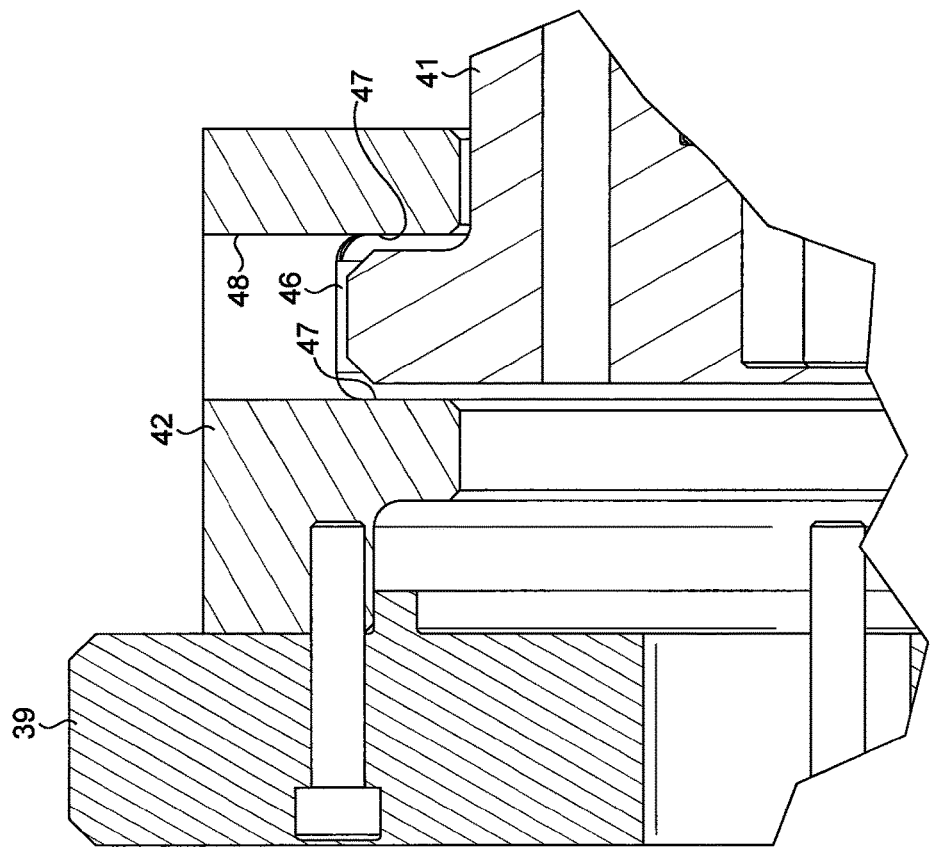
FIG. 9 is an enlarged view of the sectioned portion of FIG. 8.
Figure 8:
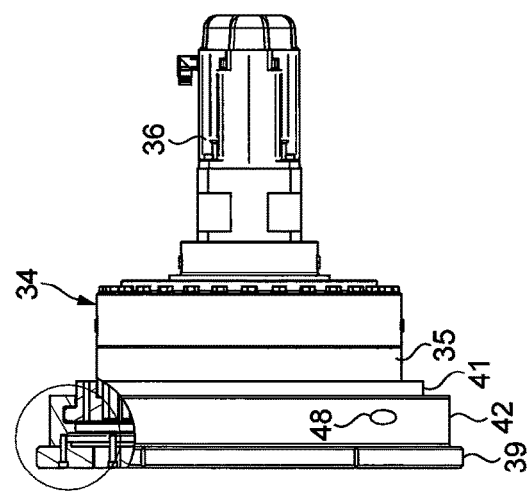
FIG. 8 corresponds to FIG. 5 and illustrates in partial section a safety collar and disc of the invention.

FIGS. 3-9 illustrate an embodiment of the invention. The manipulator of FIGS. 3 and 4 is of the same general kind as that illustrated in FIGS. 1 and 2, save that the coupling 21, arm 22, coupling 23 and seat 11 are omitted; other components are given the same reference numerals for ready reference. The rotary coupling 14 is rotatable via a co-axial motor 30, and the turntable arm 15 is constituted by parallel arms 15a, 15b, having respective eyes 31a, 31b on the pivot axis 'B'.

The invention is illustrated by reference to coupling 17 and comprises a stator 32 and a rotor 33.

The stator 32 consists of an epicyclic gearbox 34 having a casing/annulus 35 connected to turntable arm 15a via a ring of threaded fasteners. A reversible motor 36 is coupled to the casing 35, and has rotatable armature 37 coupled to the sun gear of the epicyclic gearbox 34.

The output of the epicyclic gearbox is via the planet carrier 38, which is rotatably coupled to a drive plate 39 and to the second arm 16 via respective circular arrays of threaded fasteners. The second arm comprises a rotor, though according to space and operational constraints such a rotor may move through only a restricted arcuate range.

In such an arrangement back and forth rotation of the armature 37 results in relative bi-directional pivoting movement of the arm 16.

The invention comprises a safety disc 41 and safety collar 42. The safety disc 41 comprises an annulus connected to the turntable arm 15b and surrounding the drive connection from the gearbox 34 to the second arm 16; connection is by a circular array of threaded fasteners, as illustrated.

The safety disc 41 has a circular peripheral rim 43 of substantially fixed diameter and width.

The safety collar 42 comprises semi-circular elements which substantially surround and enclose the rim 43 by virtue of an arcuate groove 44 (FIG. 9), and which are connected to the drive plate 39 by a circular array of threaded fasteners so as to be pivotable therewith. Additionally the safety collar 42 provides a convenient attachment location for a counterbalance strut 45 which applies in use a torque to the drive plate 39 in opposition to the gravitational torque acting on the arm 16.

The safety collar 42 encloses the rim 43 with a small radial and axial running clearance 46, 47, so as to permit relative pivoting movement without contact. The conventional bearing arrangement for the arm 16 with respect to the turntable arms 15a, 15b, is relied upon to maintain the clearance 46, 47 in normal operation. However should this bearing arrangement fail, due to routine wear or catastrophic mechanical failure, relative tipping of the arm 16 will be arrested immediately by contact between the rim 43 and the safety collar 42, thus preventing potential separation of the arm 16 from the turntable.

Contact between the rim 43 and collar 42 results in increased friction, which in turn requires additional drive torque from the motor to meet position and speed requirements of a control program. Such additional torque can be sensed by a conventional over-torque sensor of the motor, and utilized by a control system to safely bring the manipulator to a halt. Other means of sensing contact, for example by positional or acoustic sensors, may also be used.

It will be understood that the additional friction of contact will also result in reduced speed of relative movement, and this may be enhanced by providing one or both of the rim 43 and groove 44 with a high friction surface or coating.

One or both segments of the collar 42 may be provided with an inspection window 48 whereby the clearance 47 may be checked, for example by using a conventional feeler or 'go/no go' gauge; by this means progressive deterioration of the bearing may be periodically assessed so that a scheduled maintenance programmed may be effected.

The rim 43 and or groove 44 may also be provided with a coating, such as paint, whereby a witness mark is created upon the slightest contact. Such a mark may be easily observed when the manipulator is at rest and indicate to an unskilled machine minder that maintenance and/or adjustment may be required.

The safety rim and safety collar of the invention may be applied, if desired, to each of the couplings 14, 17, 19, 21, 23 so as to obviate risk of separation of the rotor and stator components. It will also be understood that the rim and collar need not be produced as distinct components, but may be incorporated integrally with other components to which they are connected in use. However separate components facilitates repair, replacement and retro-fitting to existing manipulators.

In a further alternative it will be understood that the collar may be functionally part of the stator, and the rim may be functionally part of the rotor. For example in the arrangement of FIG. 7, the planet carrier 38 might be connected to the disc 41 and in turn to the drive plate 39, whilst the safety collar 42 could be anchored to the turntable arm 15. In this case the counterbalance strut would be directly connected to the arm 16.

It may also be desirable to, in some circumstances, to have the safety collar radially within the safety disc, in which case the disc may be constituted by segments for the purpose of assembly. Alternatively the male and female elements may be reversed, so that the safety collar includes a protruding circular rim, and the safety disc includes a peripheral groove to engage over such a rim.

The female safety element, namely that component incorporating the groove 44, may also comprise a caliper brake for gripping the male element (the rim 43). Any suitable caliper brake may be appropriate, and it may act dynamically to bring the rotor element (e.g. arm 16) to a halt, or statically to act as a parking brake.

What is claimed:

1. A rotary device comprising an input member, an output member rotatable on said input member about an axis of rotation, and one or more rolling element support bearings between said input member and output member, said bearings being adapted to resist axial and cantilever loads of said output member in use,
wherein one of said input and output members includes a rim having a circular periphery co-axial with said axis, and wherein the other of said input and output members includes a safety collar having an arcuate groove overlapping said rim with a running clearance, such that in the event of a loss of structural integrity in the one or more rolling element support bearings, the rim contacts the safety collar and prevents substantial movement of the output member with respect to the input member.

2. The rotary device according to claim 1, wherein the collar is substantially external to the rim.

3. The rotary device according to claim 2, wherein said collar includes an inspection aperture for viewing said running clearance.

4. The rotary device according to claim 1, wherein said rim is defined by a disc attachable to a stator.

5. The rotary device according to claim 1, wherein said collar comprises arcuate segments.

6. The rotary device according to claim 5, wherein said collar is directly attached to a rotor.

7. The rotary device according to claim 1, wherein said collar is circularly continuous in use.

8. The rotary device according to claim 1, wherein said one or more support bearings comprise opposed rolling element bearings at a separation along said axis.

9. The rotary device according to claim 1, wherein said running clearance is in the range 0.5-2.0 mm in the direction of said axis.

10. A multi-axis manipulator comprising
one or more rotary devices, each rotary device comprising:
an input member,
an output member rotatable on said input member about an axis of rotation, and
one or more rolling element support bearings between said input member and output member, said bearings being adapted to resist axial and cantilever loads of said output member in use;
a stator connected to said input member, and
a rotor connected to said output member,
wherein
one of said input and output members includes a rim having a circular periphery co-axial with said axis, and
the other of said input and output members includes a safety collar having an arcuate groove overlapping said rim with a running clearance, defining a space that does not abut the one or more rolling element support bearings and such that in the event of a loss of structural integrity in the one or more rolling element support bearings, the rim contacts the safety collar and prevents substantial movement of the output member with respect to the input member.

11. The multi-axis manipulator according to claim 10, having a base mounting, the input member being closer to the base than the output member.

12. The multi-axis manipulator according to claim 10, comprising three or more axes of non-intersecting relative rotation, a rotary device of said one or more rotary devices being provided on each axis.

13. The multi-axis manipulator according to claim 10, comprising an amusement park ride.

14. The multi-axis manipulator according to claim 13, wherein said manipulator has a chair at the free end thereof.

* * * * *